Oct. 24, 1944.　　　　G. P. LUCIUS　　　　2,360,955
STALK PULLER
Filed Aug. 1, 1941　　　　2 Sheets-Sheet 1
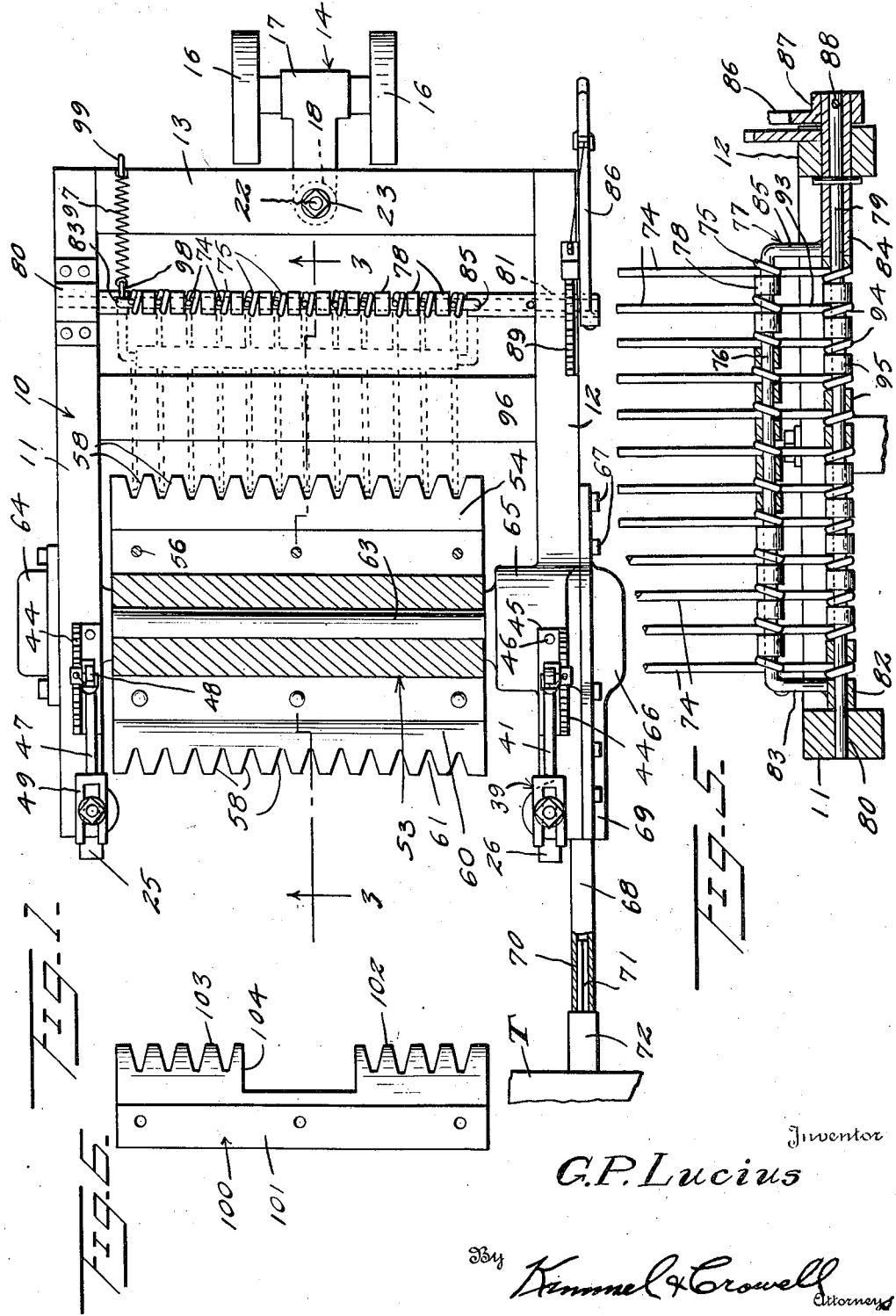
Inventor
G. P. Lucius
By Kimmel & Crowell
Attorneys

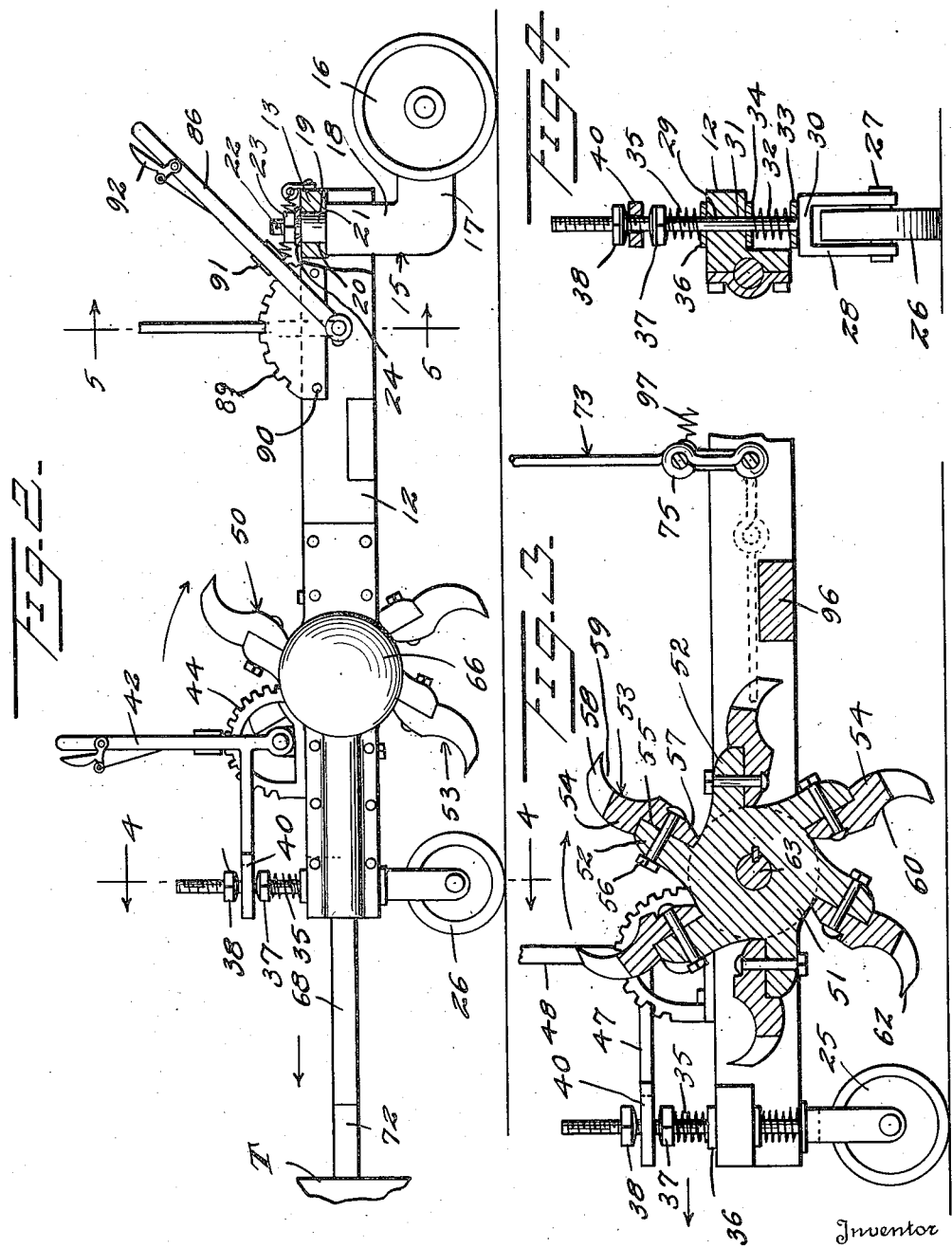

Patented Oct. 24, 1944

2,360,955

UNITED STATES PATENT OFFICE 2,360,955

STALK PULLER

George P. Lucius, Ruleville, Miss., assignor of two-fifths to J. M. Crow and one-fifth to H. Lee Herring, Ruleville, Miss.

Application August 1, 1941, Serial No. 405,097

10 Claims. (Cl. 55—66)

This invention relates to stalk pulling machines for pulling stalks out of the ground.

An object of this invention is to provide a machine capable of bodily pulling stalks from the ground which may be attached to and drawn by a tractor.

Another object of this invention is to provide an improved stalk pulling element in the form of a rotary member having a plurality of toothed blades removably fixed thereto, the rotary member being coupled with the power take-off of the tractor.

A further object of this invention is to provide a rotary stalk puller including a toothed rotary pulling member and an improved means for stripping the stalks from the teeth of the member.

A further object of this invention is to provide a rotary stalk puller which is so constructed that it may be used for one, two or more rows of stalks.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings:

Figure 1 is a detail top plan, partly broken away and in section, of a stalk puller constructed according to an embodiment of this invention;

Figure 2 is a detail side elevational view, partly broken away and in section, of the device;

Figure 3 is a sectional view taken on the line 3—3 of Figure 1;

Figure 4 is a sectional view taken on the line 4—4 of Figure 2;

Figure 5 is a sectional view taken on the line 5—5 of Figure 2; and

Figure 6 is a plan view of a modified form of puller blade structure.

Referring to the drawings the numeral 10 designates generally a mobile frame structure comprising a pair of side frame members 11 and 12 and a rear frame member 13 which is secured to the rear ends of the side frame members 11 and 12. The frame structure 10 is adapted to be positioned rearwardly of a tractor T and may be provided with a conventional draft beam structure for movement of the frame 10 with the tractor T.

A substantially centrally disposed dolly, generally designated as 14, is positioned at the rear of the frame structure 10, and includes a substantially L-shaped supporting member 15 which has a pair of wheels 16 rotatably carried by the rear end of its horizontal side 17. The vertical side 18 of the L-shaped member 15, is formed with a reduced flat extension 19 which engages in an opening 20 formed in the rear frame member 13. The reduced extension 19 forms a shoulder 21 at the upper end portion of the vertical side 18 of the L-member 15 which abuts against the under side of the frame member 13. An upwardly extending threaded stud 22 extends upwardly from the extension 19 and a nut 23 is threaded onto the stud 22. A washer 24 is interposed between the nut 23 and the upper side of the frame member 13.

A pair of front wheels 25 and 26 are rotatably and swivelly carried by the forward end portions of the longitudinal members 11 and 12. The mountings for the wheels are of like construction, being shown in detail in Figure 4, and include a shaft 27 on which the wheel 26 is rotatably mounted. The shaft 27 engages through the arms of a fork or inverted U-shaped member 28. A vertically disposed stem 29 is fixed to the bight 30 of the fork or U-shaped member 28, and swivelly engages through an opening 31 formed in the forward end portion of the frame member 12. A spring 32 is interposed between the bight 30 and the lower side of the frame member 12 and preferably a washer 33 engages between the lower end of the spring 32 and the upper side of the bight 30. A second washer 34 engages between the upper end of the spring 32 and the lower side of the frame member 12. An upper spring 35 is disposed about the stem 29 on the upper side of the frame member 12, and the lower end of the upper spring 35 engages against a washer 36 which bears against the upper side of the frame member 12. The spring tensioning nut 37 is threaded onto the stem 29 and bears against the upper end of the spring 35. Adjustment of the nut 37 will tension the two springs 32 and 35 and thereby hold the forward end portion of the frame member 12 in a desired elevated position. A second nut 38 is threaded onto the stem 29 and is positioned in spaced relation with respect to the nut 37. A fork 39 has the arms 40 thereof disposed in the space between the two nuts 37 and 38 and the fork 39 is fixed to an arm 41 carried by and fixed relative to a pivoted hand lever 42. The hand lever 42 is pivotally mounted on a pivot member 43 which is fixed in the axial center of a toothed quadrant 44. The quadrant 44 is formed with a right angularly disposed base flange 45 which is fixed by fastening devices 46 to the upper side of the frame member 12.

The wheel 25 is adapted to be adjusted with respect to the frame member 11 by means of an arm or lever 47 carried by a hand lever 48, similar to the hand lever 42. The forward end portion of the arm 47 is provided with a fork 49 engaging between a pair of spaced nuts similar to the nuts 37 and 38, shown in Figure 4.

A rotary stalk puller, generally designated as 50, is disposed between the frame members 11 and 12 adjacent the forward end portion thereof, and comprises a substantially cylindrical body 51 which has secured thereto or formed integral therewith, a plurality of longitudinal and substantially radially disposed ribs or arms 52. The body 51 has detachably secured thereto a plurality of stalk pulling blades 53. The blades 53 each comprise an elongated body 54 which is formed with a longitudinal rabbet 55 for engagement with an arm 52 and a plurality of bolts 56 engaging through the inner portions 57 of the blade bodies 54. The body 54 is of transversely arcuate configuration, as shown more specifically in Figure 3, and a plurality of substantially truncated triangular teeth 58 are formed integral with each body 54. The teeth 58 are of longitudinally arcuate configuration and have the concave side 59 thereof formed as a continuation of the concave side 60 of the body 54. Adjacent pairs of teeth 58 form triangularly-shaped gullets 61 therebetween and these gullets constitute stalk gripping means for gripping the stalks and tightly holding the stalks there-between in order that the stalks may be bodily pulled out of the ground upon rotation of the pulling member 50. Each tooth 58 is formed with a relatively keen forward edge portion 62 which, if desired, may contact with the surface of the ground and may provide a cutting means for cutting any stalks which do not engage between the gullets 61.

The pulling member 50 is fixedly secured to a shaft 63 which extends between the two frame members 11 and 12. The frame member 11 is formed with a bearing cap or housing 64 on the outer side thereof within which one end portion of the shaft 63 is rotatably positioned.

The opposite end of the shaft 63 is journalled in a bearing member 65, which is carried by the inner side of the frame member 11. A gear housing 66 is fixed, by fastening devices 67, to the outer side of the frame member 12 and encloses gears which are secured to the adjacent end of the shaft 63 and also the rear end of a driving shaft 68. The shaft 68 is journalled in a longitudinal bearing 69 formed partly in the longitudinal outer side of the frame member 12 as an extension to the gear housing 66. The forward end portion of the shaft 68 may be formed with a splined section 70 which is adapted to be coupled to a splined stub shaft 71 carried by a power take-off 72. The power take-off 72 forms a part of the tractor structure T.

In order to provide a means whereby any stalks which may stick in the gullets 61, may be stripped therefrom, I have provided a stalk stripping member, generally designated as 73. The stripping member 73 includes a plurality of tines or elongated bars 74 which are formed with an eye 75 intermediate the ends thereof. The eye 75 engages on the bight 76 of a U-shaped operator 77. The several stripping members 74 are held in spaced apart relation by means of cylindrical spacers 78 which engage on the bight 76 between adjacent pairs of eyes 75. A shaft 79 is rotatably carried by the frame members 11 and 12 adjacent the rear portions thereof, being journalled in bearings 80 and 81 carried by the frame members 11 and 12 respectively. A sleeve 82 is loosely mounted on the shaft 79 adjacent the inner side of the frame member 11 and is fixed as by welding or the like to one leg 83 of the U-shaped member 77. A second sleeve 84 is fixed to the other leg 85 of the U-shaped member 77 and loosely engages about the shaft 79. The sleeve 84 is journalled through the bearing 81 and projects outwardly from the outer side of the frame member 12. A hand lever 86 formed with a hub 87 is fixed by a fastening member 88 to the extended end portion of the sleeve 84. A toothed quadrant 89 is fixed by fastening devices 90 to the outer side of the frame member 12, and the hand lever 86 has secured thereto a spring-pressed pawl structure 91 which is operated by means of a pawl operator 92 pivotally carried by the outer end portion of the lever 86.

The bars or tines 74 are each formed with an extension 93 which is integral with the eye 75 and each extension 93 terminates in an eye 94 loosely engaging about the shaft 79. A plurality of cylindrical spacer members 95 are mounted on the shaft 79 and interposed between adjacent pairs of eyes 94. When the stripper member 73 is rocked forwardly on the shaft 79 to a substantially horizontal operative position, which is the position shown in dotted lines in Figures 1 and 3, the tines 74 are adapted to rest on a transversely extending bar 96 which is fixedly secured between the two frame members 11 and 12. The bar 96 also constitutes a frame bracing means for bracing the frame members 11 and 12 forwardly of the rear frame member 13. When the tines 74 are in a horizontal operative position they are adapted to engage, as shown in Figure 1, within the gullets 61 of the puller member 50, so that any stalks which may stick between adjacent pairs of teeth 58 will be forced out from therebetween. A spring 97 is secured at one end to an eye 98 carried by the U-shaped member 77 on the rear side thereof, and the opposite end of the spring 97 is secured to a second eye 99 which is carried by the rear frame member 13. The spring 97 is adapted to assist in the upward and rearward rocking of the stripper member 73 to an inoperative position.

In the use and operation of this stalk puller the device is adapted to be coupled to the rear of a tractor T by any suitable draft means, and the shaft 68 is coupled at its forward end to the take-off shaft of the tractor. The puller member 50 is rotated, as viewed in Figures 2 and 3, in a clockwise direction reversely from the forward movement of the tractor. The height of the puller member 50 may be adjusted by means of the hand levers 42 and 48 which will adjust the forward portion of the frame structure 10. The stalks which are pulled out of the ground by the blades 53 will be swung upwardly over the top of the puller member 50 and dropped downwardly at the rear of the puller member 50. By providing the pair of swivelly mounted wheels 25 and 26 at the forward end portion of the frame 10, the device will readily follow in the path of the tractor.

The device heretofore described may be of such a construction as to pull the stalks from one or more rows.

In Figure 6 there is disclosed a modified form of puller blade structure for use with at least two rows of stalks. The blade structure 100, shown in Figure 6, includes a body 101 which is adapted to be secured by the fastening devices 56 to the longitudinal blade supporting arms 52 of the puller member 50. The body 101 is formed with a pair of spaced apart toothed sections 102 and 103 forming a space 104 there-between. The space 104 is substantially equal to the distance between a pair of rows of stalks. In other respects the toothed sections 102 and 103 are similar in every detail to the teeth 58 of the blades 53.

What I claim is:

1. A stalk puller comprising a mobile frame for attachment to a tractor and coupling to a power take-off, a shaft journalled transversely of said frame, and a stalk pulling member fixed to said shaft, said member comprising a substantially cylindrical body, a plurality of longitudinal substantially radially arranged arms integral with said body, an elongated toothed blade for each arm, means detachably securing said blades to said arms, and pivotally adjustable stripping means for engagement between each pair of the teeth of said toothed blade.

2. A stalk puller comprising a mobile frame for attachment to a tractor and coupling to a power take-off, a shaft journalled transversely of said frame, and a stalk pulling member fixed to said shaft, said member comprising a substantially cylindrical body, a plurality of longitudinal substantially radially arranged arms integral with said body, an elongated toothed blade for each arm, the teeth of each blade having the configuration of a truncated triangle and the gullets between adjacent pairs of teeth constituting stalk gripping means, means detachably securing said blades to said arms, and pivotally adjustable stripping means for engagement between each pair of the teeth of said toothed blade.

3. A stalk puller comprising a mobile frame for attachment to a tractor and coupling to a power take-off, a shaft journalled transversely of said frame, a stalk pulling member fixed to said shaft, said member including a plurality of radially arranged toothed blades, stalk stripping means carried by said frame engageable between adjacent pairs of teeth for stripping stalks engaging therebetween, said stripping means including a plurality of elongated bars, means rockably mounting said bars on said frame, means spacing said bars in spaced apart relation, and an operator for shifting said bars to operative or inoperative position.

4. A stalk puller comprising a mobile frame for attachment to a tractor and coupling to a power take-off, a shaft journalled transversely of said frame, a stalk pulling member fixed to said shaft, said member including a plurality of radially arranged toothed blades, stalk stripping means carried by said frame engageable between adjacent pairs of teeth for stripping stalks engaging therebetween, said stripping means including a plurality of elongated bars, means rockably mounting said bars on said frame, means spacing said bars in spaced apart relation, an operator for shifting said bars to operative or inoperative position, and a transversely extending supporting member fixed to said frame and engageable by said bars for holding said bars in a horizontal operative position.

5. In combination a stalk puller and stripping means, said puller including a rotary blade structure formed with V-shaped gullets, said stripping means including a plurality of elongated spaced apart bars engageable within said gullets, means for shifting said bars from an upwardly extended inoperative position to a horizontal operative position, and a horizontal stationary means for supporting said bars in horizontal operative position.

6. In combination a stalk puller and stripping means, said puller including a rotary blade structure formed with V-shaped gullets, said stripping means including a plurality of elongated bars engageable within said gullets, means for shifting said bars from an upwardly extended inoperative position to a horizontal operative position, and a stationary horizontal supporting bar engageable with said bars when in a horizontal operative position for supporting said bars.

7. In combination a stalk puller and stripping means, said puller including a rotary blade structure formed with V-shaped gullets, said stripping means including a plurality of elongated bars engageable within said gullets, means for shifting said bars from an inoperative to an operative position, a horizontal supporting bar engageable with said bars when in operative position for supporting said bars, and means for guiding the machine in the path of a tractor.

8. The device as claimed in claim 7, said means including a pair of swivelly mounted wheels at the forward end portion of said frame.

9. A stalk puller including a frame, adapted to be attached to the power take-off of a tractor, including a rotary member having a plurality of toothed blades removably fixed thereto, means for removably mounting said blades on said rotary members, means for stripping the stalks from the teeth of the blades, said means including a plurality of elongated, rockably mounted bars, a stationary supporting bar transverse of said frame, and means whereby said puller may be used to pull stalks from a plurality of rows at one and the same time.

10. A stalk puller comprising a mobile frame for attachment to a tractor and coupling to a power take-off, a shaft journalled transversely of said frame, a stalk pulling member fixed to said shaft, said member including a plurality of radially arranged toothed blades, and stalk stripping means carried by said frame engageable between adjacent pairs of teeth for stripping stalks engaging therebetween, said stripping means including a plurality of spaced apart elongated bars rockably mounted on said frame, and means for shifting said stripping means from an inoperative to an operative position.

GEORGE P. LUCIUS.